(12) United States Patent
Roychoudhury et al.

(10) Patent No.: US 7,992,895 B2
(45) Date of Patent: Aug. 9, 2011

(54) BOLSTER DEPLOYMENT PATTERN

(75) Inventors: Raj S. Roychoudhury, Bloomfield Hills, MI (US); Michael James Best, Newmarket (CA); Timothy W. Chapman, Etobicoke (CA); Rimas Ciplijauskas, Etobicoke (CA); Changize Sadr, North York (CA); Ali Totonchian, Toronto (CA)

(73) Assignee: Salflex Polymers Ltd., Weston, Ontario (CA)

( * ) Notice: Subject to any disclaimer, the term of this patent is extended or adjusted under 35 U.S.C. 154(b) by 1039 days.

(21) Appl. No.: 11/560,473

(22) Filed: Nov. 16, 2006

(65) Prior Publication Data
US 2007/0108747 A1 May 17, 2007

Related U.S. Application Data

(60) Provisional application No. 60/738,222, filed on Nov. 17, 2005.

(51) Int. Cl.
*B60R 21/205* (2006.01)
*B60R 21/045* (2006.01)

(52) U.S. Cl. .............. 280/732; 280/728.1; 280/751; 280/752

(58) Field of Classification Search ........... 280/728.1, 280/730.1, 730.2, 732, 751, 752
See application file for complete search history.

(56) References Cited

U.S. PATENT DOCUMENTS

| | | |
|---|---|---|
| 2,834,606 A | 5/1958 | Bertrand |
| 3,473,824 A | 10/1969 | Carey et al. |
| 3,963,362 A | 6/1976 | Hollis |
| 3,981,518 A | 9/1976 | Pulling |
| 4,203,616 A | 5/1980 | Okada |
| 4,297,051 A | 10/1981 | Robinson |
| 4,362,425 A | 12/1982 | Dixon |
| 4,511,281 A | 4/1985 | Schmanski |
| 4,518,172 A | 5/1985 | Bortz et al. |
| 4,597,691 A | 7/1986 | Clarke |
| 4,721,329 A | 1/1988 | Brantman et al. |
| 4,951,963 A | 8/1990 | Behr et al. |
| 5,082,310 A | 1/1992 | Bauer |
| 5,273,309 A | 12/1993 | Lau et al. |
| 5,324,070 A | 6/1994 | Kitagawa et al. |
| 5,370,417 A | 12/1994 | Kelman et al. |

(Continued)

FOREIGN PATENT DOCUMENTS
DE 19546143 6/1997
(Continued)

OTHER PUBLICATIONS

Anonymous "Inflatable Bellows-Box Panel" Research Disclosure, Mason Publications, Hampshire, Great Britain, vol. 374, No. 9 (Jun. 1, 1995).
International Search Report, International Patent Application No. PCT/CA2006/001862, mailed Feb. 1, 2007.

(Continued)

*Primary Examiner* — Paul N. Dicksonn
*Assistant Examiner* — Barry Gooden, Jr.
(74) *Attorney, Agent, or Firm* — Michael Best & Friedrich LLP (57) ABSTRACT

This invention is in the field of safety devices to lessen injuries arising from impact in vehicles, particularly automobiles. A bolster which may be employed to reduce impact severity to passengers from either frontal or side impacts is activated by impact sensing devices. The housing of the bolster has a lateral length L. Upon activation, the bolster is inflated with an activating fluid and extends the lateral length L of the bolster upon activation.

16 Claims, 6 Drawing Sheets

U.S. PATENT DOCUMENTS

| | | | |
|---|---|---|---|
| 5,382,051 A * | 1/1995 | Glance | 280/751 |
| 5,456,490 A | 10/1995 | Carter et al. | |
| 5,476,283 A | 12/1995 | Elton | |
| 5,498,026 A | 3/1996 | Eckhout | |
| 5,533,748 A | 7/1996 | Wirt et al. | |
| 5,536,043 A | 7/1996 | Lang et al. | |
| 5,556,128 A | 9/1996 | Sinnhuber et al. | |
| 5,567,375 A | 10/1996 | Filion et al. | |
| 5,716,093 A | 2/1998 | Sadr | |
| 5,845,937 A | 12/1998 | Smith | |
| 5,865,468 A | 2/1999 | Hur | |
| D412,880 S | 8/1999 | Sadr | |
| 5,931,493 A | 8/1999 | Sutherland | |
| 5,957,493 A * | 9/1999 | Larsen et al. | 280/743.1 |
| 5,967,594 A * | 10/1999 | Ramanujam | 296/153 |
| 5,968,431 A | 10/1999 | Ang et al. | |
| 6,032,978 A | 3/2000 | Spencer et al. | |
| 6,158,766 A * | 12/2000 | Kowalski | 280/730.1 |
| 6,203,057 B1 * | 3/2001 | Spencer et al. | 280/730.1 |
| 6,213,497 B1 * | 4/2001 | Spencer et al. | 280/730.1 |
| 6,250,665 B1 | 6/2001 | Sutherland et al. | |
| 6,305,710 B1 | 10/2001 | Bosgeiter et al. | |
| 6,471,242 B2 * | 10/2002 | Schneider | 280/732 |
| 6,517,103 B1 | 2/2003 | Schneider | |
| 6,568,743 B1 | 5/2003 | Jayasuriya et al. | |
| 6,578,867 B2 * | 6/2003 | Khoudari et al. | 280/730.1 |
| 6,619,689 B2 | 9/2003 | Spencer et al. | |
| 6,688,643 B2 * | 2/2004 | Schneider | 280/753 |
| 6,712,385 B2 * | 3/2004 | Enders | 280/730.1 |
| 6,758,493 B2 | 7/2004 | Conlee et al. | |
| 6,817,625 B2 | 11/2004 | Hjerpe | |
| 6,848,715 B2 * | 2/2005 | Nelson et al. | 280/753 |
| 6,874,811 B2 | 4/2005 | Enders et al. | |
| 6,971,667 B2 * | 12/2005 | Enders et al. | 280/730.1 |
| 6,976,706 B2 * | 12/2005 | Smith et al. | 280/753 |
| 6,991,252 B2 * | 1/2006 | Enders | 280/728.1 |
| 7,021,652 B2 | 4/2006 | Kumagai et al. | |
| 7,086,663 B2 | 8/2006 | Honda | |
| 7,093,846 B2 | 8/2006 | Reiter et al. | |
| 7,093,851 B2 | 8/2006 | Lotspih | |
| 7,144,032 B2 | 12/2006 | Lunt et al. | |
| 7,168,733 B2 | 1/2007 | Kumagai et al. | |
| 7,213,840 B2 * | 5/2007 | Kumagai | 280/752 |
| 7,350,852 B2 * | 4/2008 | Rust et al. | 296/187.06 |
| 7,367,587 B2 * | 5/2008 | Taoka | 280/751 |
| 7,393,013 B2 | 7/2008 | Best et al. | |
| 7,396,040 B2 * | 7/2008 | Enders et al. | 280/730.1 |
| 7,413,215 B2 | 8/2008 | Weston et al. | |
| 7,422,234 B2 | 9/2008 | Huber et al. | |
| 7,448,645 B2 | 11/2008 | Bederka et al. | |
| 7,481,457 B2 | 1/2009 | Best et al. | |
| 7,568,722 B2 | 8/2009 | Sato et al. | |
| 7,578,518 B2 | 8/2009 | Ochiai et al. | |
| 2001/0054811 A1 * | 12/2001 | Spencer et al. | 280/730.1 |
| 2003/0197354 A1 * | 10/2003 | Beland et al. | 280/730.1 |
| 2004/0007856 A1 | 1/2004 | Enders et al. | |
| 2004/0075252 A1 | 4/2004 | Pan | |
| 2004/0100075 A1 | 5/2004 | Sakai et al. | |
| 2004/0135353 A1 * | 7/2004 | Enders et al. | 280/730.1 |
| 2004/0145163 A1 * | 7/2004 | Galmiche et al. | 280/730.1 |
| 2004/0155447 A1 | 8/2004 | Smith et al. | |
| 2004/0163872 A1 | 8/2004 | Lincoln et al. | |
| 2004/0163873 A1 | 8/2004 | Polz et al. | |
| 2004/0178616 A1 | 9/2004 | Yoshikawa | |
| 2004/0232666 A1 | 11/2004 | Sato et al. | |
| 2005/0023802 A1 * | 2/2005 | Enders et al. | 280/728.2 |
| 2005/0029781 A1 | 2/2005 | Enders et al. | |
| 2005/0052005 A1 | 3/2005 | Lunt et al. | |
| 2005/0052010 A1 * | 3/2005 | Best et al. | 280/751 |
| 2005/0052011 A1 * | 3/2005 | Best et al. | 280/752 |
| 2005/0057024 A1 | 3/2005 | Weston et al. | |
| 2005/0098996 A1 * | 5/2005 | Enders | 280/751 |
| 2005/0253369 A1 * | 11/2005 | Taoka | 280/752 |
| 2006/0214400 A1 * | 9/2006 | Enders et al. | 280/730.1 |
| 2007/0052219 A1 | 3/2007 | Rust et al. | |
| 2007/0108746 A1 | 5/2007 | Ochiai et al. | |
| 2007/0152431 A1 * | 7/2007 | Rust et al. | 280/730.2 |
| 2007/0296187 A1 | 12/2007 | Ochiai | |
| 2008/0061537 A1 * | 3/2008 | Enders | 280/730.1 |
| 2009/0152848 A1 * | 6/2009 | Sadr et al. | 280/730.2 |
| 2009/0152849 A1 * | 6/2009 | Saraf et al. | 280/730.2 |

FOREIGN PATENT DOCUMENTS

| | | |
|---|---|---|
| DE | 19858520 | 4/2000 |
| DE | 10123207 | 7/2002 |
| EP | 0274535 | 7/1988 |
| EP | 1426249 | 6/2004 |
| EP | 1663725 | 12/2009 |
| GB | 2272670 | 5/1994 |
| JP | 63-002741 | 1/1988 |
| JP | 06-037011 | 5/1994 |
| JP | 11-091454 | 4/1999 |
| JP | 2000-326810 | 11/2000 |
| JP | 2002-522286 | 7/2002 |
| JP | 2004-338677 | 12/2004 |
| JP | 2007-504050 | 3/2007 |
| WO | 00/07851 | 2/2000 |
| WO | 00/50270 | 8/2000 |
| WO | 2004/071818 | 8/2004 |
| WO | 2006/132990 | 12/2006 |
| WO | 2007/056849 | 5/2007 |
| WO | 2009/124394 | 10/2009 |
| WO | 2009/124395 | 10/2009 |
| WO | 2009/124401 | 10/2009 |

OTHER PUBLICATIONS

Written Opinion of the International Search Authority, International Patent Application No. PCT/CA2006/001862, mailed Feb. 1, 2007.
Supplementary European Search Report, European Patent Application No. EP 06 80 4728.1, dated Jun. 15, 2009.
European Examination Report, European Patent Application No. EP 06 80 4728.1, dated Oct. 27, 2009.
Response to European Examination Report, European Patent Application No. EP 06 80 4728.1, dated Mar. 3, 2010.
Communication under Rule 71(3) EPC Intention of Grant, European Examination Report, European Patent Application No. EP 06 80 4728.1, dated Jun. 14, 2010.
Canadian Patent Application No. 2,535,661 Notice of Allowance dated Feb. 1, 2010.
Canadian Patent Application No. 2,535,661 Office Action dated Jan. 20, 2009.
European Patent Application No. 04761769.1 Examination Report dated Mar. 23, 2007.
European Patent Application No. 04761769.1 Communication under Rule 71(3) EPC dated Jul. 1, 2009.
European Patent Application No. 04761769.1 Decision to Grant dated Nov. 19, 2009.
European Patent Application No. 04761769.1 Supplementary European Search Report dated Nov. 1, 2006.
European Patent Application No. 06771989.8 Supplementary European Search Report dated Feb. 8, 2010.
European Patent Application No. 06771989.8 Examination Report dated May 21, 2010.
International Patent Application No. PCT/CA2004/001605 International Search Report dated Feb. 8, 2005.
International Patent Application No. PCT/CA2006/001862 International Preliminary Report on Patentability dated May 29, 2008.
International Patent Application No. PCT/CA2009/000475 International Search Report dated Jul. 7, 2009.
International Patent Application No. PCT/CA2009/000476 International Search Report and Written Opinion dated Jul. 28, 2009.
International Patent Application No. PCT/CA2009/000507 International Search Report dated Jul. 14, 2009.
International Patent Application No. PCT/US2006/021507 International Search Report and Written Opinion dated Oct. 26, 2006.
International Patent Application No. PCT/US2006/021507 International Preliminary Report on Patentability dated Dec. 6, 2007.
Japanese Patent Application No. 2006-525586 Office Action dated Apr. 6, 2010.
U.S. Appl. No. 11/915,797 Office Action dated Apr. 14, 2010.
U.S. Appl. No. 11/915,797 Office Action dated Feb. 18, 2010.

* cited by examiner

BOLSTER DEPLOYMENT PATTERN

FIELD OF THE INVENTION

This invention relates to the field of safety devices as are often installed in motor vehicles, particularly automobiles. Amongst many safety devices that are installed in vehicles to lessen injuries arising from impact are bolsters. A bolster may be part of an instrument panel in which case the bolster extends transversely to the vehicle. Bolsters may also be used for side impact events in which case the length of a bolster may extend longitudinally of the vehicle. Such bolsters may be mounted in door panels, side panels or roof panels of the vehicle. Bolsters can also be utilized in other locations and directions as desired to lessen injuries arising from impact events.

BACKGROUND OF THE INVENTION

In the first instance, bolsters are designed with a design point of impact. The design point of impact is determined by assuming the position of a statistical male or female occupant. Ideally, the vehicle occupant is in a designated position and is using a seatbelt or other similar safety harness. However, because of the differentiation in size of the vehicle occupants and because not all vehicle occupants use seatbelts, and therefore the location of the occupant may not be as expected, the point of impact between the occupant and the bolster may occur at other than the most desirable design location. Vehicles also have many other envelope constraints as to the amount of space available for mounting a bolster. In many cases, the vehicle mounting envelope constraints confine a bolster to a certain lateral length. It would be desirable, however, that the bolster, when called upon to provide its safety function, have a greater lateral length.

As used in this description and claims, the term "lateral" is used to describe the transverse width of the bolster. If the bolster were mounted against an instrument panel, the lateral extent of the direction would be transverse of the vehicle. If the bolster were mounted to a door frame, the lateral extent of the bolster would extend longitudinally of the vehicle. If the bolster were mounted on an angular support pillar such as an A pillar, the lateral length of the bolster would extend longitudinally and angularly of the vehicle. In short, the term "lateral" is intended to encompass any mounting location of the bolster with regard to the vehicle.

In accordance with the information set out above, it would be desirable, if a bolster were able to increase its lateral extent upon activation.

SUMMARY OF THE INVENTION

In accordance with this invention, an inflatable bolster includes a housing, the housing defines a substantially closed volume for receiving fluid under pressure. The bolster has a source of pressurizing fluid. The housing defines an occupant face and a mounting face. The housing has a lateral length L in the direction substantially parallel to the occupant face. The bolster comprises an extension structure for extending the lateral length L of the bolster upon pressurization of the bolster.

BRIEF DESCRIPTION OF THE DRAWINGS

The invention will be better understood, upon review of the attached drawings which illustrate various embodiments in accordance with the invention.

DETAILED DESCRIPTION OF THE INVENTION

Bolsters may be used to provide energy absorption to lessen injury in the event of a vehicle/occupant impact. A bolster achieves the energy absorption by filling the bolster with a pressurized fluid, usually a gas, upon the occurrence of an impact event. Once the bolster is filled with fluid, then energy is absorbed by releasing the fluid through an orifice of controlled size.

Some bolsters are described as active bolsters. An active bolster differs from an inactive bolster in that the bolster moves relative to its support surface towards the occupant. By decreasing the distance between the occupant face of the bolster and the occupant, then a greater length of time may be used to slow the speed of the occupant relevant to the speed of the vehicle and thus provide an opportunity for reduction of force in decelerating the occupant relative to the vehicle. The invention of the present application may be utilized with either active or inactive bolsters.

Typically bolsters are pressurized by a source of gas which may be contained in a cartridge. The gas may be released by initiators which may be linked to various vehicle sensors. The vehicle sensors may sense a vehicle impact which may be in the nature of an excessive deceleration, as may be typical in frontal impacts of moving vehicles, a rapid vehicle acceleration as may be involved in a rear impact, vehicle lateral acceleration as may be involved in impacts from either side of the vehicle or impending vehicle rollover. In all cases, when such a vehicle event occurs, there develops a relative velocity between the vehicle and the occupants riding in the vehicle. The occupants may then strike vehicle structure and the purpose of the bolster is to reduce the forces involved so as to lessen injury.

Figure 1:
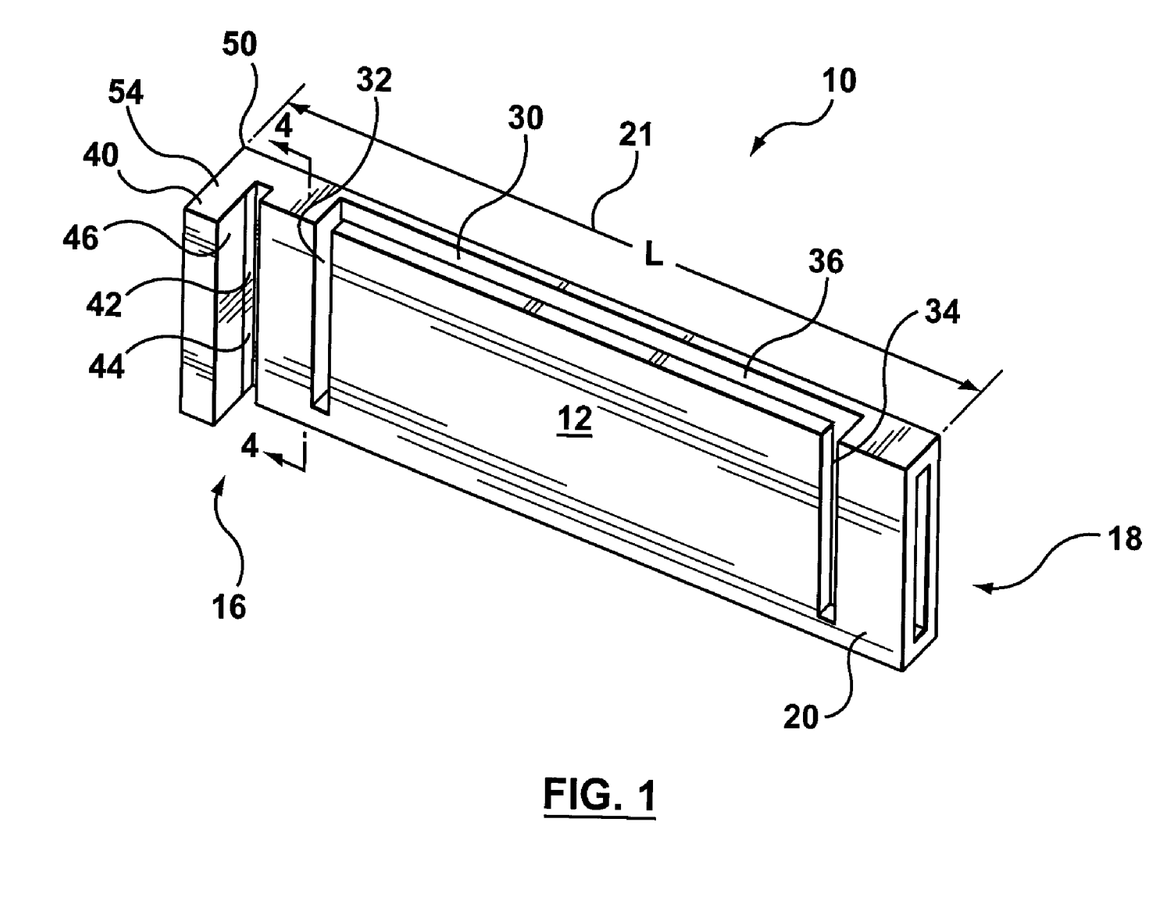
FIG. 1 illustrates an isometric view of a bolster in accordance with the invention which incorporates two alternate embodiments of the invention.
Figure 2:
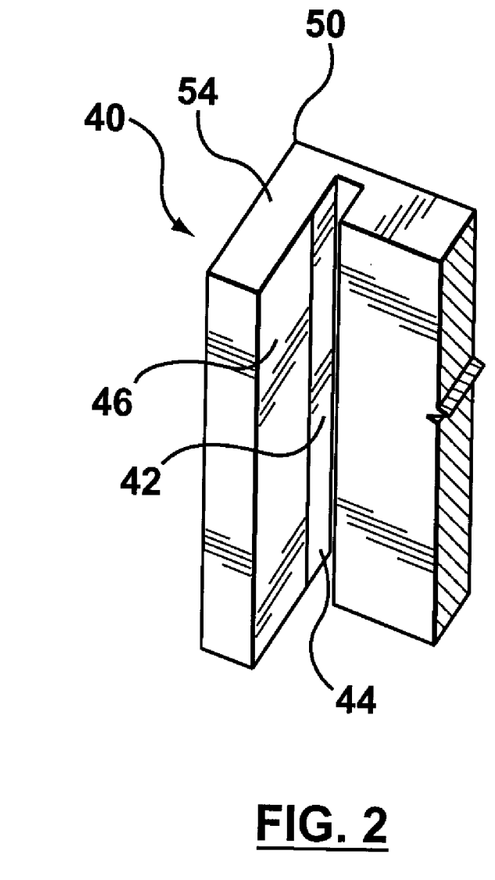
FIG. 2 illustrates an isometric view of the un-deployed configuration of the left end of the bolster of FIG. 1.
Figure 3:
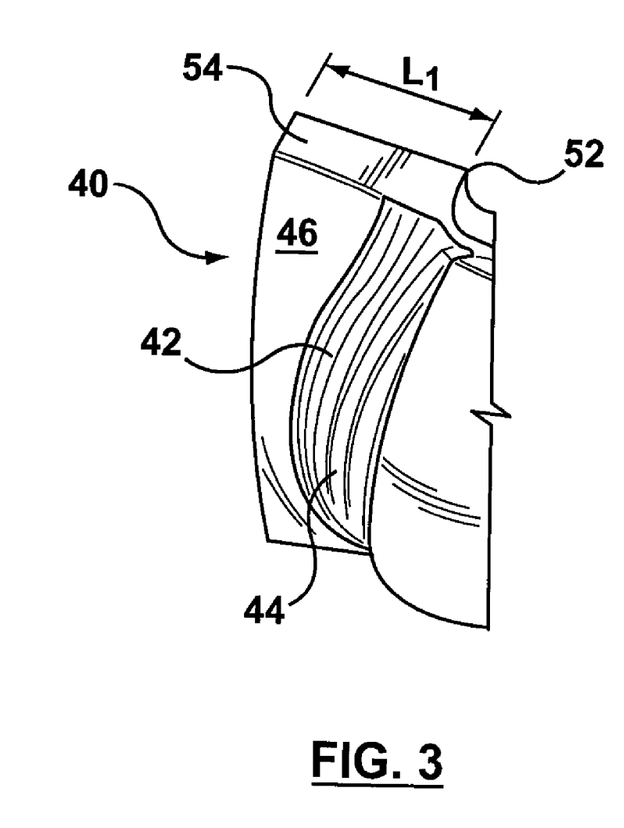
FIG. 3 illustrates an isometric view of the deployed configuration of the structure illustrated in FIG. 2.

FIG. 1 illustrates a bolster generally at 10. The bolster has a mounting face 12 and an occupant face 14, visible in FIG. 4. The bolster 10 includes an extension structure 16 located at the left hand end of bolster 10 and extension structure 18 located at the right hand end of bolster 10. While bolster 10 has been illustrated as embodying the two extension structures 16 and 18 respectively, it will be recognized that in accordance with this invention, a bolster may use any combination of one or more of extension structures 16 and 18. Thus, a bolster may utilize one such extension structure 16 or two or more extension structures 16. Similarly, a bolster may involve one extension structure 18 or two or more extension structures 18. A bolster may have any combination of one or more of the two extension structures.

In accordance with this embodiment of this invention as illustrated in FIG. 1, the bolster is a unitary structure. Being a unitary structure, the bolster is preferably made by a blow molding procedure. The bolster includes a housing 20. The housing defines the occupant face 14 and the mounting face 12. The housing defines a substantially closed volume 22. The volume 22 is described as substantially closed in that the volume is intended to confine the pressurizing gas when the bolster is activated. The housing will thus either define an inlet for pressurized gas or pressurized gas will be stored in a preactivation cylinder 23 within the housing. The housing will also define one or more exhaust apertures to permit release of gas during the energy absorption phase.

As shown in the un-deployed stage, the housing defines a lateral length L extending in the direction which is substantially parallel to the occupant face.

It will be understood that upon activation, fluid will fill the closed volume of the bolster. In the embodiment illustrated in FIG. 1, the bolster also includes expansion facilitating structure 30. This allows the bolster to be an active bolster so that the occupant face will move toward the occupant to assist in reduction of forces experienced by the occupant on contacting the bolster. In the particular example illustrated in FIG. 1, the expansion facilitating structure 30 comprises two vertically extending pleats 32 and 34 and a laterally extending pleat 36. The effect of these pleats during deployment will be discussed below.

Figure 4:
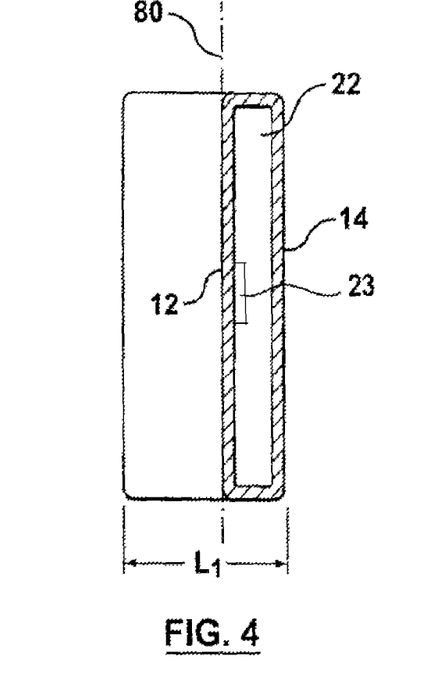
FIG. 4 illustrates a cross-section of the bolster of FIG. 1 taken along line 4-4.
Figure 6:
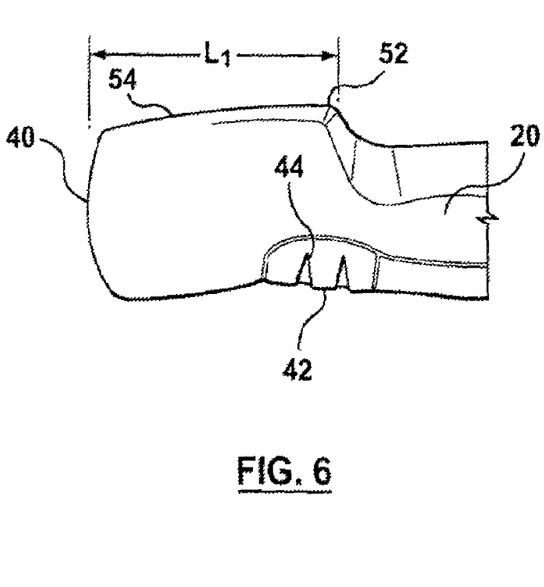
FIG. 6 is a plan view of the deployed bolster of FIG. 5.

Focusing now on the left hand end of the structure, in FIG. 1, the housing 20 includes a main portion 21 and an auxiliary portion 40. The extension structure 16 comprises in part the auxiliary portion 40. The auxiliary portion 40 is an integral part of the housing 20 and is also a hollow structure. The auxiliary portion 40, extends away from the occupant face 14 in a direction which is substantially perpendicular to the dimension L. The auxiliary portion 40 has a length $L_1$ as illustrated in FIG. 4. Upon deployment of the bolster, the auxiliary portion 40 moves hingedly relative to the main portion 21 to extend the lateral length L of the bolster 10 by an amount substantially equal to $L_1$ thereby providing a laterally enlarged bolster for use during the deployment phase. The extension structure 16 also includes an expandable area 42. The expandable area 42, preferably includes at least one pleat 44. The expandable area 42 is formed at the intersection of the mounting face 12 and an inner face 46 of the auxiliary portion 40. Expansion of the expandable area 42 and the pressurization of the auxiliary portion 40 in conjunction with pressurization of the main portion causes the auxiliary portion 40 to move hingedly to the deployed position as shown in FIG. 6. As the auxiliary portion 40 moves hingedly relative to the main portion 21, the corner 50 where the auxiliary portion 40 meets with the occupant face of the main portion 21, distortion will occur, although the apex may remain as is shown diagrammatically at 52 in FIG. 6. In addition, the uppermost surface 54 of the auxiliary portion 40 may also deform upwardly under the effect of the pressurizing fluid.

Figure 7:
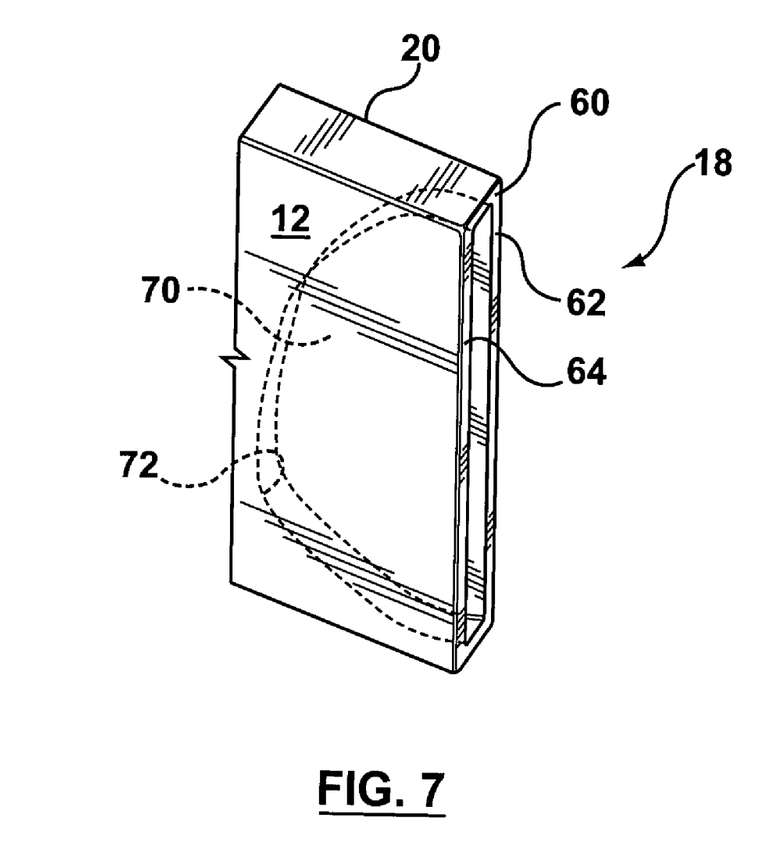
FIG. 7 is a perspective view of the structure of the right-hand end of the bolster of FIG. 1 in the un-deployed configuration.
Figure 8:
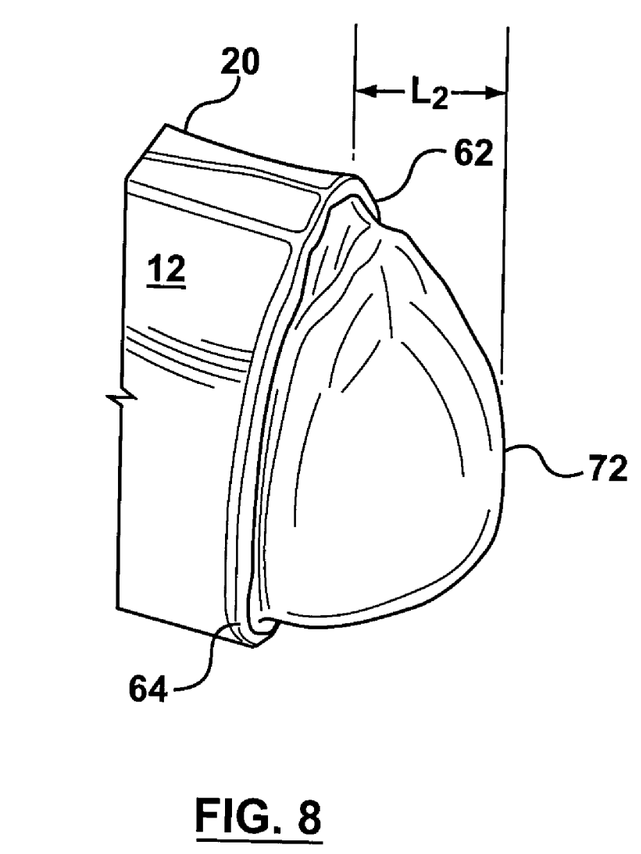
FIG. 8 illustrates in perspective view the structure of FIG. 7 in the deployed configuration.

Focusing now on the right hand end of the bolster 10 as illustrated in FIG. 1, reference is made to FIGS. 7 and 8. The extension structure 18 in this embodiment, is illustrated in an end face 60 of the housing 20. The end face 60 includes an end face wall 62 which comprises the occupant face 14 of the bolster 10. Additionally, the end face 60 includes a mounting wall face 64, which coincides with the mounting face 12. In the embodiment illustrated, the extension structure 18 includes an expandable area 70. The expandable area advantageously includes at least one first pleat 72.

As shown in FIG. 7, the expandable area 70 is in the form of at least one pleat 72 which extends internally into the closed volume 22 of the bolster 10. Upon activation of the bolster, the pressurized fluid, pushes the pleat 72 out, relative to the end face 60, where the pleat is able to expand to the position shown in FIG. 8. The pleat 72, having extended externally of the housing 20 now provides an additional length $L_2$ to the bolster for use in energy absorption on contact with a vehicle occupant (see FIG. 8).

Preferably, the bolster 10 is made in a blow molding operation. In blow molding, a parison is extruded, the parison is enclosed in a blow mold structure, and a blowing gas is injected into the interior of the parison. Upon expansion of the parison, the parison then expands so as to obtain the shape of the mold cavity. Generally speaking, the wall thickness of the parison is relatively uniform throughout the expanded parison subject to the necessity of plastic flow to obtain the shape as defined by the mold. In the blow molding process, slides can be established in the mold. The term "slide" is used to describe a structure that is used to move from a withdrawn position (usually not in the mold cavity) to an extended position, before the parison has cooled. By extending the slide, which effectively moves the slide against the wall of the parison, the wall of the parison is stretched to move inwardly of the mold surface. Thus, use of a slide may be used to create the at least one pleat 72 in connection with the extension structure 18 and to locate that structure so that it extends internally of the housing 20. The use of the slide does not, however, rupture the wall of the parison. Thus the finished product can still remain as a housing defining a substantially closed volume. Use of the slide, will create a diminution of the thickness of the wall of the parison, this helps to create a relatively thinner wall, which is then capable of undergoing the movement between the un-deployed and deployed configurations illustrated in FIGS. 7 and 8 without rupture of the wall of the housing. To facilitate movement of this type, the plastic used for the parison may be selected from the group of suitable materials including by way of example thermoplastic olefins or a plastic available from Salflex Polymers under the trade mark SALFLEX 245™.

Similarly, the extension structure 16 illustrated in FIGS. 1 through 4 may be formed by the use of slides in a blow mold. The auxiliary portion 40 can be readily formed in the blow mold. The expandable area 42 and the at least one pleat 44 can be created in the blow mold by use of a slide which moves some of the parison wall internally of the mold cavity to create the structure upon cooling, as shown at the left hand end of FIG. 1. This process also is capable thus of creating an expandable area while ensuring that the housing still remains with a substantially closed volume.

As shown in FIG. 1, the bolster 10 is what is referred to as an active bolster. Thus, rather than simply pressurizing the bolster and using the pressurized thickness of the bolster for energy absorption, it is desirable that the occupant face extend outwardly toward the occupant. The pressurization of the bolster may itself distort the bolster so that the bolster achieves a more rounded configuration than the un-deployed, substantially rectangular configuration illustrated in the embodiment shown in FIG. 1. However, in order to facilitate further movement of the occupant face relevant to the mounting face, the bolster 10 may also include the expansion structure 30. The expansion structure 30 can include second pleats to facilitate such expansion. The pleats may be made by use of slides or by initial configuration of the mold depending upon the location of the mold parting lines and the configuration of the mold cavity. Most preferably as shown in FIG. 1, the expansion structure, includes the generally vertically extending pleats 32 and 34 as well as the longitudinally extending pleat 36. By providing at least one pleat and preferably a series of pleats, the bolster may deform outwardly relative to the mounting face 12.

Figure 5:
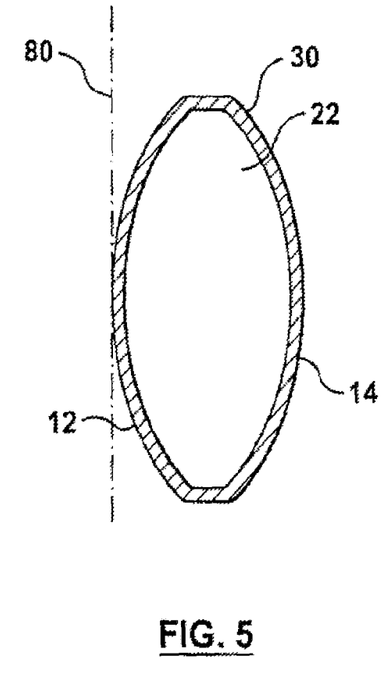
FIG. 5 is a similar cross-section to FIG. 4 showing the bolster of FIG. 4 in deployed configuration.

As shown in FIG. 4, the mounting face 12 will be mounted against a suitable support or reaction structure illustrated generally by the dotted line 80. As shown in FIG. 5, it is assumed there is no relative movement of the reaction surface 80. Thus, deformation of the expandable structure 30, as well as general deflection of the wall of the housing, means that the housing 20 will form a substantially sausage shape. As well, the general deflection of the wall of the housing, means that the housing 20 will form a substantially sausage shape as shown in FIG. 5. As shown, the occupant face 14 is no longer necessarily planar but is moved effectively closer to the occupant. This provides a greater distance for energy absorption before the occupant comes into contact with the mounting surface 80. As shown in FIG. 6, the auxiliary portion 40 has hingedly moved relative to the main portion by expansion of the expandable area 42 through expansion of the at least one pleat 44.

Figure 9:
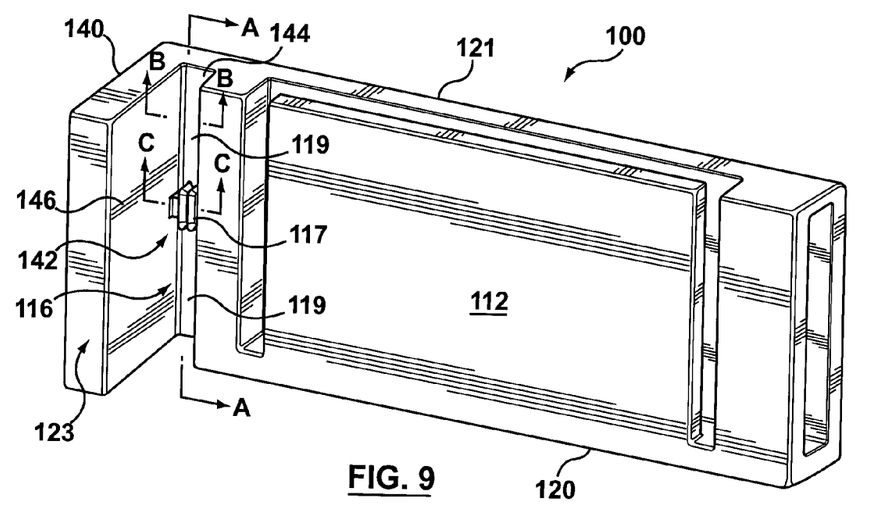
FIG. 9 illustrates a perspective view of a bolster in accordance with the invention which incorporates an alternative embodiment of the invention.
Figure 10:
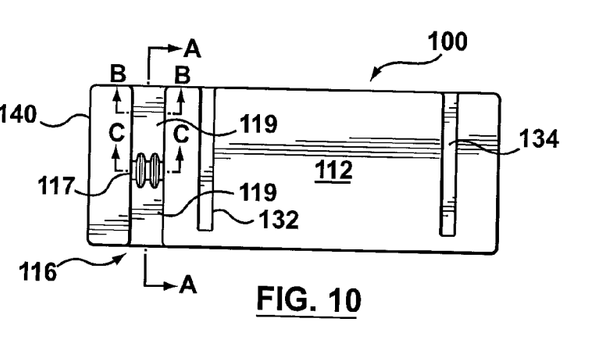
FIG. 10 is a front view of the bolster shown in FIG. 9.

FIG. 9 illustrates, in perspective, an alternative embodiment of the invention. In FIG. 9, the bolster shown generally at 100 includes a mounting face 112 and an occupant face 114. The bolster 100 is an active bolster and includes an extension structure 116 located at the left hand end of bolster 100 as illustrated in FIG. 9. The bolster 100 includes a housing 120. The housing 120 defines a substantially closed chamber 122. In many respects the bolster 100 is similar to the bolster 10 illustrated in FIG. 1.

The bolster 100 includes a main portion 121 and an auxiliary portion 140. The extension structure 116 comprises in part the auxiliary portion 140. The auxiliary portion 140 is an integral part of the housing 120 and is also a hollow structure. The auxiliary portion 140 includes an auxiliary chamber 123.

The extension structure 116 also includes an expandable area 142. The expandable area 142 preferably includes at least one pleat 144. In this respect, the embodiment illustrated in FIG. 9 operates similar to the embodiment illustrated in FIG. 1.

Figures 11, 12:
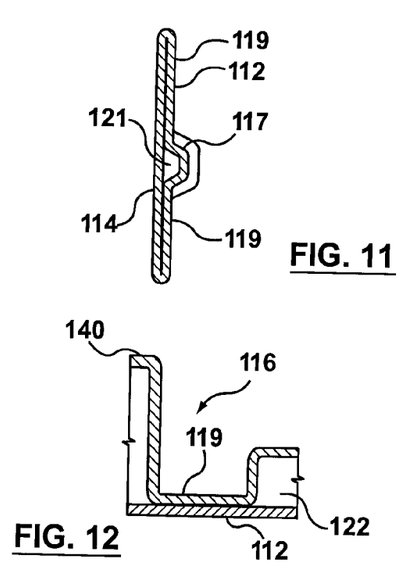
FIG. 11 is a sectional view taken along line AA as shown in FIGS. 9 and 10.
FIG. 12 is a sectional view taken along lines BB shown in FIGS. 9 and 10.
Figure 13:
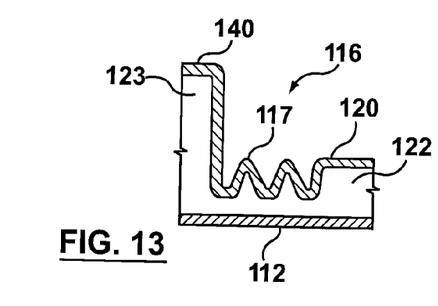
FIG. 13 is a sectional view along line CC illustrated in FIGS. 9 and 10.

The principal difference between these two embodiments however is the ability to change the rate at which the activating fluid flows into the auxiliary chamber 123. The source of inflating fluid to cause activation of the bolster is first directed to the chamber 122 in main portion 120. To control the rate of flow of activating fluid from the main portion to the auxiliary portion, a restriction means including a limited flow path is provided. In this example, the expansion structure 116 includes a hollow ribs 117. The rib 117 is defined by slides which may be activated during the blow molding manufacturing process by setting out depressed areas 119 on either side of the rib. As shown in FIGS. 11, 12 and 13, the hollow rib 117 is formed by slides which move the mounting face 112 against the interior of the occupant face 114. This provides a channel 121 for flow of fluid from the chamber 122 within the main portion 120 to the auxiliary chamber 123 within the auxiliary portion 140. Also, as shown in this embodiment the rib 117 is itself in the form of a bellows so as to not restrict the desired movement of auxiliary portion 140 relative to main portion 121. By selection of the number of ribs 117 and the sizing of those ribs, the inflation characteristics of the auxiliary portion 140, can be controlled by the designer.

It is preferred that in operation, particularly with respect to an active bolster, that the main portion of the bolster first begin to modify its position relative to the vehicle occupant before movement of the auxiliary portion 140 to the deployed position. By providing a relatively restrictive flow path using at least one such rib 117, the deployment timing of the auxiliary portion 140 can be selected as desired. Any number of ribs 117 having any particular size of flow channel or configuration may be utilized. By using at least one such rib, it is possible to obtain what is, in effect, a slightly delayed deployment of the auxiliary portion 140 relative to the time that the main portion 121 begins its deployment upon activation.

Figure 14:
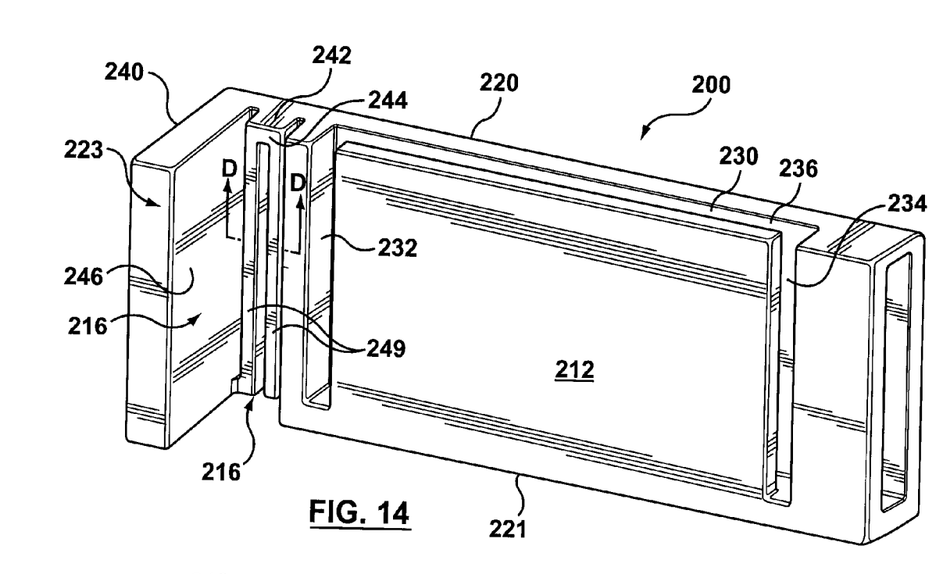
FIG. 14 illustrates an isometric view of a bolster in accordance with the invention which incorporates a further alternative embodiment of the invention.

FIG. 14 illustrates a further embodiment and illustrates a bolster 200. The bolster 200 is similar to the bolster 100 except that the extension structure 216 is provided to activate the movement of the auxiliary portion 240 relevant to the main portion 220. In this case, the extension structure 216 includes an expandable area 242 which includes at least one pleat 244. In this case the pleat 244 has a central depressed portion 245, together with two grooves 247 which define the pleat 244.

Figure 15:
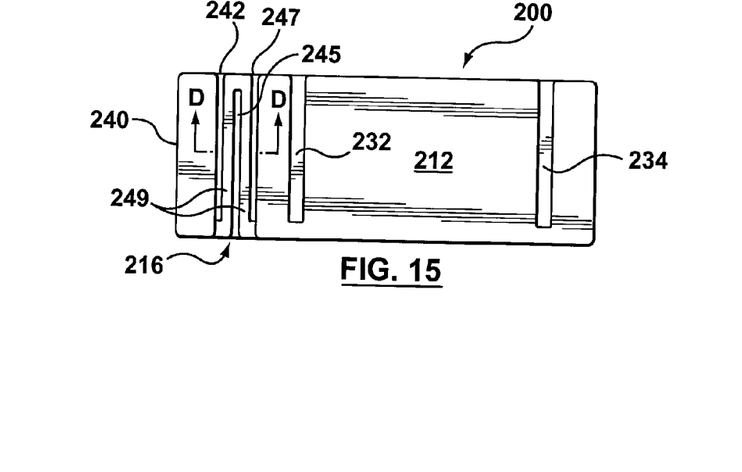
FIG. 15 is a front view of the bolster of FIG. 14.
Figure 16:
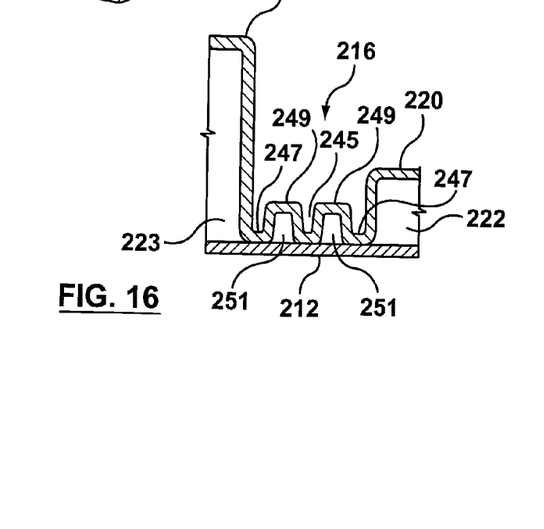
FIG. 16 is a sectional view along line DD of FIGS. 14 and 15.

As shown in FIG. 16, the depressed areas 247 and 245 constitute therebetween, a pair of ribs 249 which extend vertically upwardly, as shown in FIG. 14. This in turn defines a pair of conduits 249, each conduit having internally thereof a flow path 251. Because the depressed areas 247 do not extend all the way to the lower edge of the pleat 244 as shown in FIGS. 14 and 15, there is a flow path for activating fluid, firstly from the main portion 220 to the first rib 249, vertically upwardly through the first flow path 251 and then horizontally across the upper edge, as illustrated in FIGS. 14, and 15 and then downwardly through the second flow path 251 where it may then enter into the auxiliary portion 240. Thus, the pleat 244 provides a serpentine path flow. This serpentine path flow by its length and cross-sectional size constitutes a restriction means which can also be used to provide a somewhat restricted flow and thus a slightly delayed deployment of the auxiliary portion 240 upon application of activating fluid to the main portion 220.

Either of the bolsters 100 or 200 illustrated in FIGS. 9 through 13 and 14 through 16 respectively, may be fitted with similar structures on the right hand end as depicted, or structures similar to structure 18 as discussed in association with the bolster of FIG. 1. It will also be possible to vary the number and location of the various flow channels to achieve the desired activation time delay as may be considered desirable.

In accordance with the embodiments illustrated and described herein, it will be recognized, that a bolster has been provided having an un-deployed length L measured in a direction referred to as the transverse direction. Upon deployment, utilizing either of the embodiments as described herein, the bolster may gain an additional length in that transverse direction by expansion of an extension structure to provide increased lateral length. The orientation of the bolster may be selected as desired by the vehicle designer and thus the directions, vertical and horizontal are given only by way of illustrative example and not by limitation. In fact, the bolster may be active or inactive and may be located in the vehicle as desired and in any orientation desired.

All descriptions and illustrations contained herein are to be taken by way of example only and reference shall be made to the claims for the full scope and extent of the invention.

The invention claimed is:

1. An inflatable bolster,
said bolster comprising a housing,
said housing defining a substantially closed volume for receiving a fluid under pressure,
said bolster having a source of pressurized fluid,
said housing defining an occupant face and a mounting face,
said housing having a lateral length L in the direction substantially parallel to said occupant face, wherein said bolster comprises at least one extension structure for extending the lateral length L of said bolster upon pressurization of said bolster,
wherein said bolster is a unitary structure, and
said at least one extension structure comprises at least one first expandable area and said lengthening of said lateral length L occurs, at least in part, by expanding said at least one first expandable area, and
said housing comprises a main portion and at least one auxiliary portion, said main portion defining said lateral length L and said auxiliary portion extending away from said occupant face prior to pressurization of said bolster, said auxiliary portion comprising, at least in part, said at least one extension structure,
wherein said auxiliary portion has a length L1 in a direction substantially perpendicular to the direction of length L prior to pressurization of said bolster;
and wherein said auxiliary portion moves hingedly relative to said main portion upon said pressurization to extend the lateral length L of said bolster by an amount substantially equal to L1.

2. The bolster of claim 1 wherein said bolster is blow molded.

3. The bolster of claim 1 wherein said bolster comprises a plurality of said auxiliary portions.

4. The bolster of claim 1 wherein said bolster further includes flow restriction means for permitting flow of pressurization fluid from said main portion to said auxiliary portion.

5. The bolster of claim 4 wherein said flow restriction means includes at least one hollow rib.

6. The bolster of claim 5 wherein said at least one rib extends generally transversely of said bolster.

7. The bolster of claim 5 wherein said restriction means defines a flow path which is serpentine.

8. The bolster of claim 7 wherein said at least one first expandable area includes at least one first pleat and said flow path extends along said pleat.

9. The bolster of claim 1 wherein said at least one first expandable area includes at least one first pleat.

10. The bolster of claim 9 wherein said at least one first pleat is located so that upon pressurization of said housing, said pleat facilitates said hinged movement of said auxiliary portion.

11. The bolster of claim 9 wherein said housing comprises at least one second extension structure for facilitating expansion of said housing upon said pressurization.

12. The bolster of claim 11 wherein said second expansion structure includes at least one first pleat.

13. The bolster of claim 12 wherein said second extension structure is located adjacent an end face of said bolster opposite to said auxiliary portion.

14. The bolster of claim 13 wherein said at least one first pleat of said second expansion structure is located on said end face and extends internally of said housing prior to said pressurization and extends externally of said housing after said pressurization.

15. An inflatable bolster,
said bolster comprising a housing,
said housing defining a substantially closed volume for receiving a fluid under pressure,
said bolster having a source of pressurizing fluid,
said housing defining an occupant face and a mounting face,
said housing having a lateral length L in the direction substantially parallel to said occupant face, wherein said bolster comprises extension structure for extending the lateral length L of said bolster upon pressurization of said bolster,
and wherein said bolster is a unitary structure;
and wherein said bolster comprises at least one first expandable area and said lengthening of said lateral length L occurs, at least in part, by expanding said expandable area;
and wherein said housing comprises a main portion and at least one auxiliary portion, said main portion defining said lateral length L and said auxiliary portion extending away from said occupant face, said auxiliary portion comprising, at least in part, said extension structure;
and wherein said bolster further includes flow restriction means for permitting flow of pressurization fluid from said main portion to said auxiliary portion;
and wherein said flow restriction means includes at least one hollow rib;
and wherein said restriction means defines a flow path which is serpentine.

16. The bolster of claim 15 wherein said first expandable area includes at least one first pleat and said flow path extends along said pleat.

* * * * *